Aug. 20, 1940.    V. W. KLIESRATH ET AL    2,212,442
HYDRAULIC GEARSHIFT MECHANISM
Filed Nov. 22, 1935    6 Sheets-Sheet 1

INVENTOR
VICTOR W. KLIESRATH
ROY W. SANFORD
BY
H. O. Clayton
ATTORNEY

Aug. 20, 1940.   V. W. KLIESRATH ET AL   2,212,442
HYDRAULIC GEARSHIFT MECHANISM
Filed Nov. 22, 1935   6 Sheets-Sheet 3

INVENTOR
VICTOR W. KLIESRATH
ROY S. SANFORD
BY
ATTORNEY

Fig. 11

Aug. 20, 1940.    V. W. KLIESRATH ET AL    2,212,442
HYDRAULIC GEARSHIFT MECHANISM
Filed Nov. 22, 1935    6 Sheets-Sheet 5

INVENTOR
VICTOR W. KLIESRATH
BY  ROY S. SANFORD
    H.O.Clayton
    ATTORNEY

FIG.14

Patented Aug. 20, 1940

2,212,442

UNITED STATES PATENT OFFICE 2,212,442

HYDRAULIC GEARSHIFT MECHANISM

Victor W. Kliesrath, South Bend, Ind., and Roy S. Sanford, New York, N. Y., assignors to Bendix Products Corporation, South Bend, Ind., a corporation of Indiana Application November 22, 1935, Serial No. 51,138

14 Claims. (Cl. 74—335)

This invention relates in general to a device for transmitting power through the medium of a non-compressible fluid, and finds particular utility as an operating means for the change-speed transmission of an automotive vehicle.

Broadly stated, the invention contemplates means for selectively translating either the translatory or angular movement of either a control or actuating member into a corresponding movement of a remotely located transmission controlling actuated member. In the attainment of this end there is suggested, in a preferred embodiment of the invention, two hydraulically operated devices, an actuating device and an actuated motor interconnected by fluid transmitting conduits, the parts being so constructed and arranged that a closed system is provided, the liquid of the system being subject to a circuitous movement to effect the various gear shifting operations of the actuated motor.

Yet another object of the invention is to provide a simple, durable and cheaply manufactured substitute for the conventional gearshift lever mechanism of an automotive vehicle.

A further object of the invention is to provide a manually or power operated hydraulic means for operating the shifter rods of a conventional three speeds forward and reverse transmission mechanism, the manual operation of said means or the manual operation of the control valve of the power means accurately simulating the operation of the conventional gearshift lever.

The invention also contemplates the provision of a manually operable control member, mounted upon the dash of the vehicle, said member being operable in a manner similar to the operation of the conventional gearshift lever to operate the change-speed transmission.

A further object of the invention relates to the provision of a hydraulically operated transmission operating mechanism comprising an actuating device and an actuated motor, the latter functioning in one of its modes of operation as a lever member to select an operation of the transmission.

Yet another object of the invention is to provide hydraulic means for effecting an operation of a conventional three speeds forward and reverse automotive transmission, said means including a hydraulic motor or ram selectively connectible to the shift rails of the transmission, said ram being operated by a combined actuating motor and selector valve mechanism.

A further object of the invention is to provide power means, preferably of the vacuum suspended type, for operating the aforementioned hydraulic actuating device, said power means being controlled by a follow-up valve mechanism whereby the operator may progressively feel the gears into mesh.

Other objects of the invention, desirable details of construction and combinations of parts will become apparent from a study of the following specification taken in conjunction with the accompanying drawings, in which.

Figure 1:
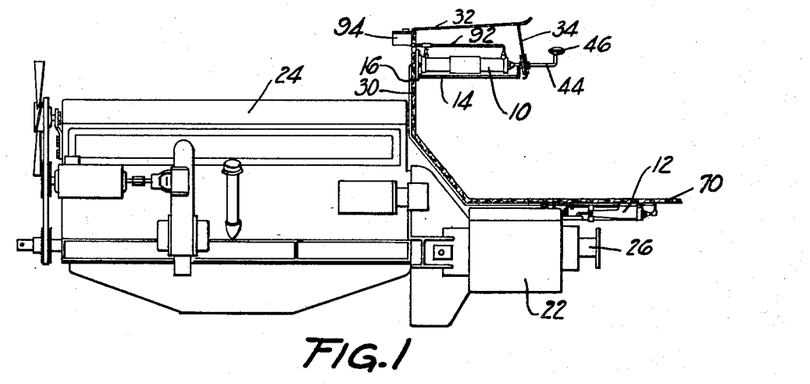
Figure 1 is a diagrammatic view of a preferred embodiment of the hydraulic transmission operating mechanism constituting my invention.

There is disclosed in Figures 1–10 inclusive a preferred embodiment of our invention. Referring to Figure 1, there is disclosed a manually operated actuating fluid device 10 interconnected with an actuated fluid motor 12 by conduits 14 and 16, the latter motor serving to operate shift rails 18 and 20, Figure 5, of a standard three speeds forward and reverse transmission 22. The transmission serves to interconnect an internal-combustion engine 24 with a propeller shaft 26, such construction being of conventional design.

Figure 2:
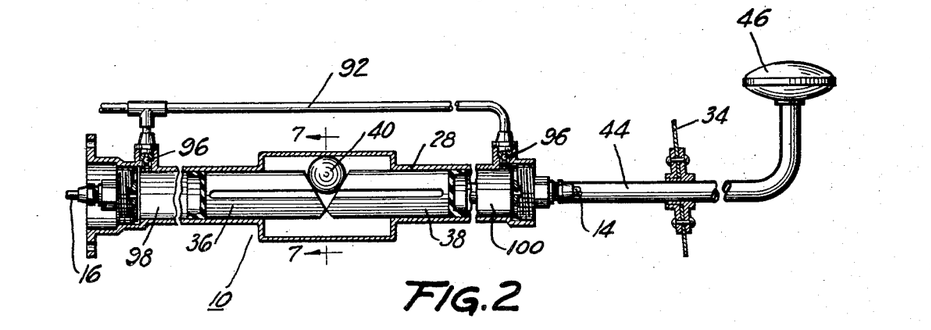
Figure 2 is a sectional view of the manually operated actuating device of the invention, said view being taken on the line 2—2 of Figure 3.
Figure 3:
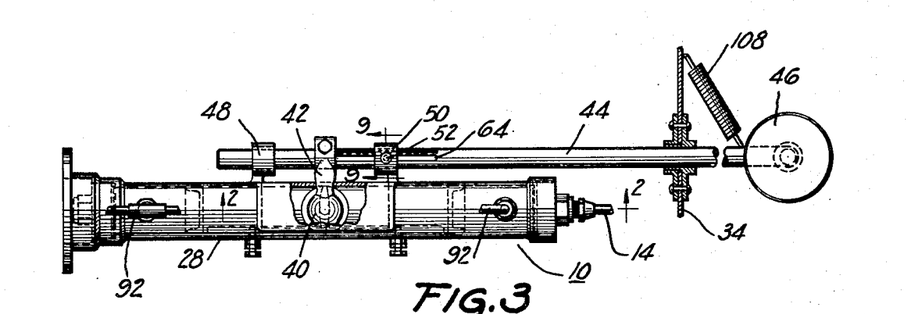
Figure 3 is a plan view of the device of Figure 2.

The actuating device 10, oftentimes referred to as a master cylinder, is disclosed in detail in Figures 2 and 3 and comprises a double-ended cylinder 28 preferably so mounted upon the front wall 30 of the driver's compartment as to be pocketed within the cowl 32 and dash 34. Plungers 36 and 38 are reciprocably mounted within the cylinder 28, said plungers being beveled at their abutting ends, as disclosed in Figure 2, to accommodate a ball 40, the latter constituting one end of an arm 42 secured to a shaft 44. The shaft is provided with a control handle 46 and is slidably and rotatably mounted in the dash 34 and in brackets 48 and 50 secured to the cylinder 28. A guide pin 52, Figures 9 and 10, adjustably mounted within the bracket 50, extends within any one of branches 54, 56, 58, 60 and 62 of an H-shaped slot 64 in the shaft 44, said pin and slot construction providing a means insuring a gear selecting movement of the handle 46 simulating the operation of the shift lever of a conventional change-speed transmission.

Figure 4:
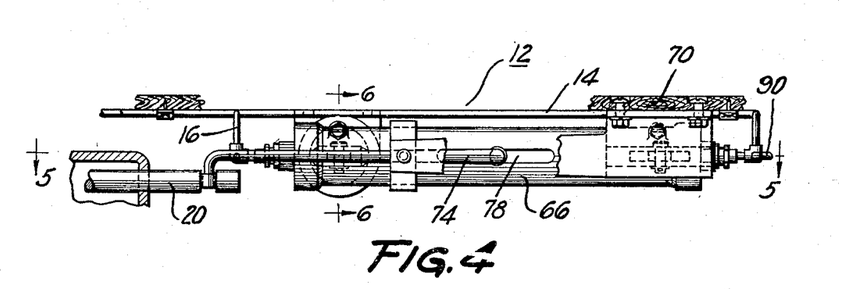
Figure 4 is a side view of the actuated motor of the invention, the same being shown connected with the low and reverse gearshift rail of the transmission.
Figure 5:
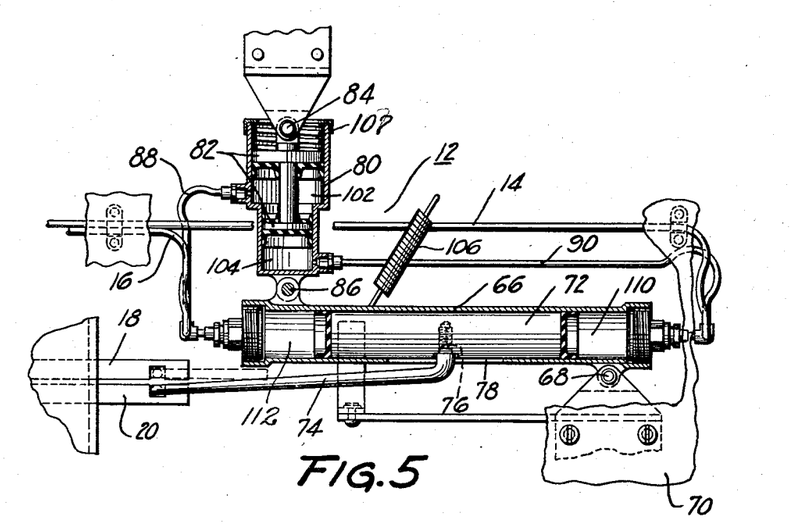
Figure 5 is a sectional view of the mechanism of Figure 4, taken on the line 5—5 thereof.
Figure 6:
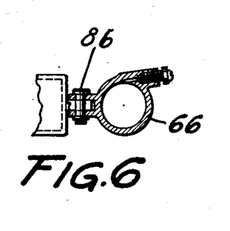
Figure 6 is a sectional view of the actuating device, the same being taken on line 6—6 of Figure 4.
Figure 7:
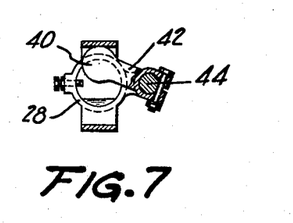
Figure 7 is a sectional view, taken on the line 7—7, of Figure 2.
Figure 8:
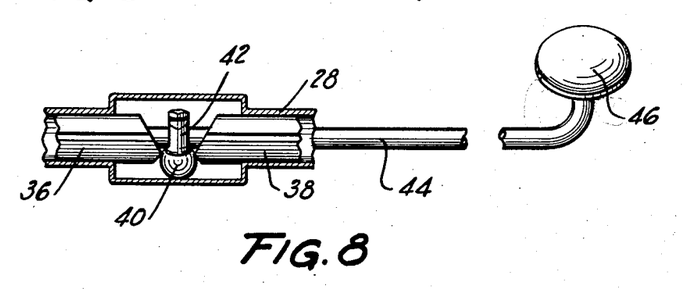
Figure 8 is a fragmentary view of the actuating device mechanism, the same being adjusted preliminary to effecting an operation of the low and reverse shift rail of the transmission.
Figure 9:
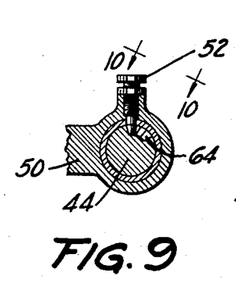
Figure 9 is a sectional view, taken on the line 9—9, of Figure 3.
Figure 10:
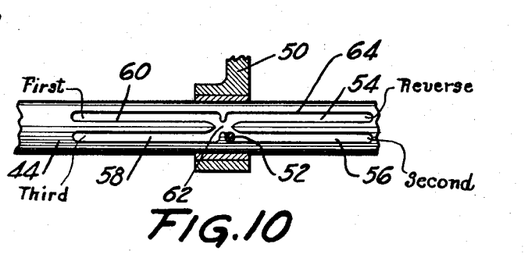
Figure 10 is a fragmentary view, taken on the line 10—10, of Figure 9 disclosing the H slot construction of the actuating mechanism, whereby the control of the latter is made to simulate the conventional operation of a standard transmission operating shift lever.

Referring now to Figures 4 and 5, detailing the actuated fluid motor, there is disclosed a double-ended cylinder 66 pivotally mounted at 68 to the chassis beneath the floor 70 of the driver's compartment. The cylinder preferably houses a floating piston 72, the latter adapted to be operably connected to one or the other of the conventional shift rails 18 and 20, by means of a link 74 fixedly secured at 76 to the center of the piston 72 and slidable within a slot 78 in the cylinder 66. The actuated motor unit further comprises a two-diametered cylinder 80 housing a double-ended piston 82, the latter being pivotally secured at 84 to the chassis. The cylinder 80 is pivotally mounted at 86 to the cylinder 66 and is in fluid transmitting connection therewith by means of conduits 88 and 90. As diagrammatically disclosed in Figure 11, the motor units 10 and 12, together with the interconnecting conduits 14, 16, 88 and 90, provide a system for the power transmitting fluid, the latter being fed into the system via a conduit 92 from a tank 94 or other convenient source of supply, such as the force feed lubricating system of the engine. Check valves 96 provide a one-way fluid transmitting connection between the conduit 92 and the cylinder 28.

Figure 11:
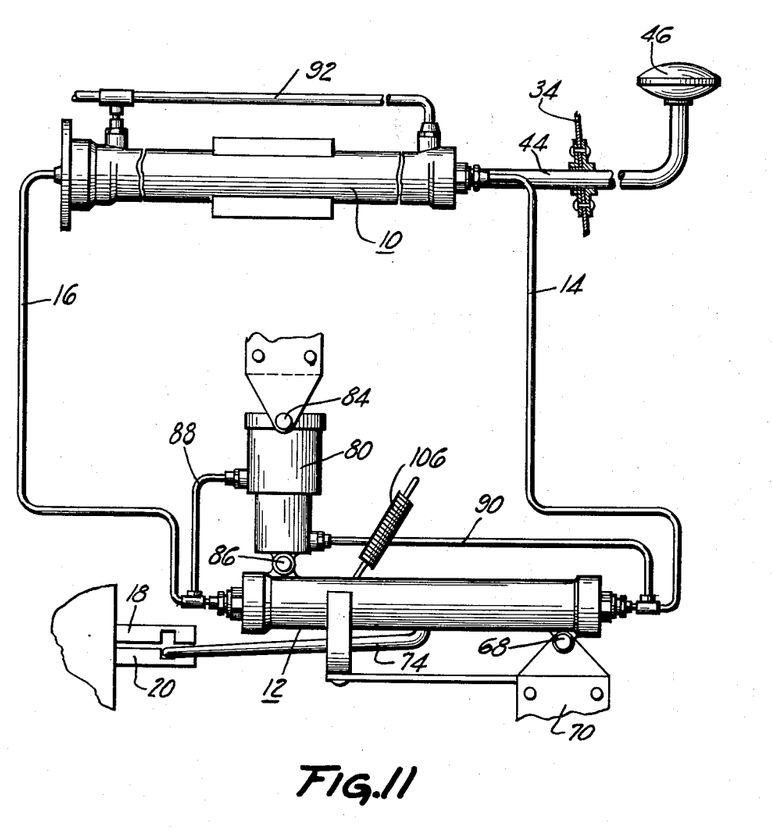
Figure 11 is a diagrammatic view disclosing the actuated and actuating motor units interconnected by fluid transmitting conduits.

Describing more specifically the units 10 and 12 and the conduits interconnecting the same as clearly disclosed in Figure 11, the conduit 14 is connected at one of its ends with one end of the motor unit 10 and at its other end with one end of the cylinder 66 of the motor unit 12. The conduit 16 is connected at one of its ends with the other end of the motor 10 and at its other end with the other end of the motor 12. Conduit 90 is a branch leading from the conduit 14 to the chamber 104 of the cylinder 80, and conduit 88 is a branch leading from the conduit 16 to the chamber 104 of the cylinder 80.

Describing now the operation of the aforementioned mechanism, after a disengagement of the clutch, the handle 46, assuming the transmission to be in neutral with the pin 52 in the laterally extended branch 62 of the H slot, is rotated counter-clockwise until the pin is at the end of the branch. This movement of the handle serves to effect a corresponding counter-clockwise rotation of the arm 42, the ball moving downwardly to the position disclosed in Figure 8, forcing the plungers 36 and 38 apart. The fluid within compartments 98 and 100 of the cylinder 28 is thus forced out of the cylinder. Since plungers 36 and 38 are moved an equal amount, piston 72 of cylinder 66 is subjected to equal and oppositely acting pressures, and hence the piston 72 remains stationary. Equal amounts of fluid will therefore be conducted to the respective compartments 102 and 104 of cylinder 80 via conduits 14, 16, 88 and 90, and because of the differential areas of the two piston heads 82 it will be understood that the cylinder 80 is accordingly moved downwardly, imparting to the cylinder 66 connected therewith a bodily angular movment against the tension of springs 106 and 107, normally biasing the cylinder 66 and the piston 72 is housed therein to a position to interconnect the link 74 with the second and high gear shift rail 18. Furthermore, a spring 108 is provided to bias the handle 46 to a position disclosed in Fig. 10 preparatory to effecting a shift into either high or second gear.

With the above described operation the link 74 is moved into the position disclosed in Figure 5 to operate the low and reverse gear shift rail 20. The rail 20 having been selected, the operator now pulls the control lever rearwardly, to thereby move piston 38 to the right, Figure 2, the power fluid being forced from the compartment 100, and an equal quantity of fluid being accordingly forced into compartment 110 of the motor 12 to force the piston 72 and its connected link 74 to the left to thereby establish a low gear selection of the transmission.

The clutch is now engaged and the speed of the vehicle increased as desired, whereupon, after disengaging the clutch, the driver will probably operate the transmission to effect a second gear setting. To obtain such a setting the control handle 46 is moved forwardly, forcing, via the conduit 16, fluid into the left-hand end of the motor 12. The piston 72 and its connected link 74 are thus moved to the right to return the shift rail 20 to its neutral position. The springs 106 and 108 then function respectively to actuate the handle 46 and the motor 12, returning the same to a position to effect the second gear setting of the transmission. In this operation both the handle 46 and the motor 12 are rotated clockwise by the springs. To complete the desired setting the handle 46 is pushed forwardly, thus forcing, via the conduit 16, fluid into the compartment 112, which results in the movement of the piston 72, its connected link 74 and rail 18.

The transmission having now been established in the second gear position, the clutch is again engaged and the vehicle accelerated to the desired speed. To place the transmission in high gear, after disengaging the clutch, the handle 46 is pulled rearwardly, again forcing fluid from the actuating motor 10, via the conduit 14, into the compartment 110 of the actuated motor 12.

The rail 18 is thus moved forwardly to establish the high gear setting of the transmission.

Figures 12, 13:
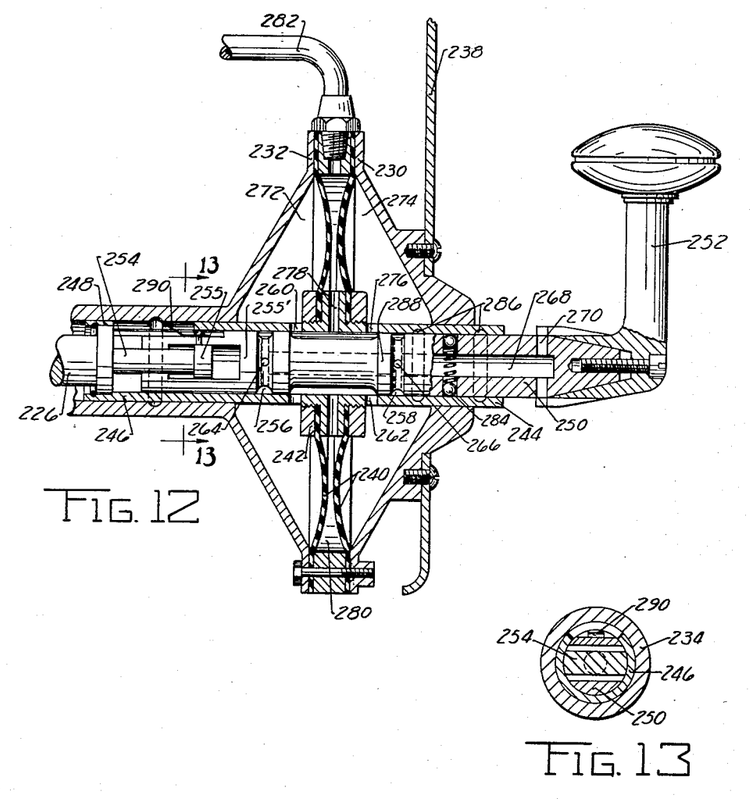
Figure 12 is a sectional view of another embodiment of our invention wherein the actuating device is power operated by a vacuum operated mechanism controlled by a follow-up valve mechanism.
Figure 13 is a sectional view, taken on line 13—13 of Figure 12, disclosing the spring mechanism for retaining the control member in position to place the transmission in neutral.

From the above description it will be evident that a compact and efficient transmission operating mechanism is provided. The control handle 46 or handle 252 may be actuated in a manner fully simulating the operation of a conventional shift lever to either neutralize the transmission or to effect any one of its gear ratio selections. The cylinder 80 and piston 82 provide a motor which, together with the springs 106 and 107, provides means for effecting a selection of the transmission shift rail to be operated, and the pressure differential motor disclosed in Figure 12 provides a power means for establishing the transmission in gear. The several pistons may be proportioned so as to effect a gear shift with a minimum of effort, and another advantage of the mechanism is in the elimination of the conventional shift lever, thus increasing the leg room in the driver's compartment; and as described above, the transmission, in the event of the failure of the power means, may be operated wholly by the physical effort of the driver, or should the pressure differential operated power means prove inadequate to establish the gears in mesh, the driver may supplement said power means with his own effort.

Figure 14:
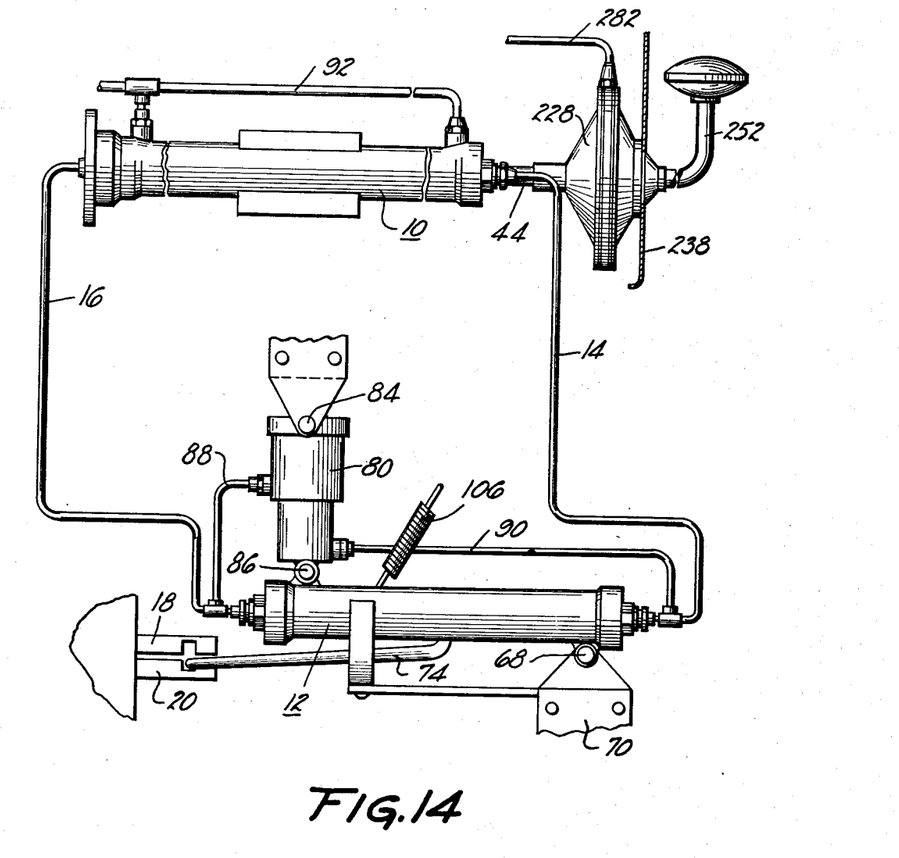
Figure 14 is another diagrammatic view, similar to Figure 11, disclosing the power means of Figure 12 associated with the mechanism shown in Figure 11.

There is disclosed in Figures 12 and 14 another modification of transmission operator wherein the so-called actuating device is power operated instead of manually operated.

Describing this modification, the power means for operating a piston 226, which is suitably connected to the shaft 44, Figure 2, comprises a vacuum suspended motor 228 including two casing members 230 and 232, the latter being extended to provide a tubular portion 234 for the piston 226. The casing member 230 is preferably secured to the dash 238. The power element of the vacuum motor comprises a two-part diaphragm 240, the hub portion 242 of which is extended to provide sleeves 244 and 246, the latter being secured at 248 to the piston 226. Within the sleeves, which, together with the hub, constitute a valve member, there is reciprocably mounted a valve plunger member 250 operable by a handle member 252, the sleeves, hub and plunger being ported and grooved, as described below, to provide a follow-up control valve mechanism for controlling the operation of the vacuum motor. The plunger 250 is bored at one end thereof to accommodate a guide or extension 254 secured to the piston 226, thereby providing a structure to facilitate the follow-up valve operation of the sleeve 246 and the plunger 250 and to tie the plunger with the piston 226 to enable the operator to rotate the piston to select and operate the low and reverse shift rail. If for any reason the power means should fail, the transmission may be operated solely by the physical effort of the driver, for the enlarged end 255 of the extension 254 will abut the face 255' within the bored end of the plunger 250 after the lost motion is taken up. There will then be provided a solid connection between the manually operated handle 252 and the shift rails of the transmission. It is also apparent that with the above-described mechanism the transmission may be operated concurrently by power and by the physical effort of the driver.

Describing the operation of the aforementioned mechanism, the shift rail to be operated having been selected, the handle is either pushed or pulled to register one or the other of grooves 256 and 258 in the plunger 250 with one or the other of a series of ports 260 or 262 in the sleeves 244 and 246 adjacent the hub 242. Grooves 256 and 258 are vented to the atmosphere via ducts 264 and 266, a duct 268 in the plunger and ducts 270 adjacent the handle 252. Compartments 272 and 274 of the vacuum motor are normally connected with a source of vacuum, preferably the intake manifold, via ports 260 and 262 in the sleeves 244 and 246, a groove 276 in the plunger 250, a port 278 in the hub 242, a chamber 280 defined by the diaphragm members 240 and a conduit 282.

Assuming that the handle 252 is pushed forwardly to establish second gear, ports 262 are registered with groove 258, thereby admitting air to the compartment 274, the remaining compartment 272 being partially evacuated. The diaphragm 240 is forthwith subjected to a force measured by the differential of pressure acting on the diaphragm. The piston 226 is thus moved in a direction to establish a meshing of the second speed gears. It is to be observed, however, that once the groove 258 is registered with the ports 262, the driver being advised of such registration by means of spring pressed ball members 284 latching within detents 286, movement of the handle stops and the subsequent movement of the sleeve 244, by virtue of the aforementioned differential pressure action, serves to move the ports 262 out of registry with the groove 258 and into registry with a land portion 288 on the plunger. The valve is now said to be lapped and the gears are meshed. There is thus provided a follow-up valve control of a vacuum suspended motor and, if desired, the registering ports, ducts and grooves may be proportioned so as to provide successive steps or increments of movement in the meshing of the gears to thereby feel the same into engagement and obviate clashing. Such a construction is particularly desirable in the operation of the transmissions of the heavier trucks and busses where remote control of power means for operating the transmission is desired.

A spring 290 serves to normally maintain the valve parts in position to neutralize the transmission, placing both of the compartments 272 and 274 of the motor in communication with the source of vacuum. The driver in positioning the handle to place the transmission in neutral will hear and/or feel the spring 290 snap into place in a groove in the sleeve 234.

Although this invention has been described in connection with a certain specific embodiment, the principles involved are susceptible of numerous other applications that will readily occur to persons skilled in the art. The invention is, therefore, to be limited only as indicated by the scope of the appended claims.

We claim:

1. The combination with a selective transmission mechanism having a plurality of spaced shifter bars movable longitudinally to establish different gear relations, of a shifter member movable into engagement with one or another of said bars, means operatively connected with said shifter member for so moving the same, means including a double-acting fluid pressure motor operatively connected with said shifter member for moving the same together with the shifter bar selected thereby in opposite directions, means including valve mechanism for controlling and directing the flow of fluid power to said motor, means for controlling the operation of the first named means and means for actuating the two last named means in order to control the energization of said motor and to actuate the first named means including a control lever movable laterally for actuating said first mentioned means and movable longitudinally for controlling said valve mechanism.

2. In a gear shifting mechanism of the type having a pair of shifting bars adapted to be selectively engaged and moved longitudinally to establish a desired gear relation, the combination therewith, of a remotely-positioned manually-operable control lever movable laterally and longitudinally in a selective gear shifting simulating manner, a shifting member, force transmitting means operatively connected with said shifting member and actuated by lateral movements of said control lever to move said member into engagement with one or the other of said shifting bars, a single double-acting power device connected with said member to actuate the latter to move either shifting bar engaged thereby in either of opposite directions, and means including valve means controlled by longitudinal movements of said control lever in opposite directions for energizing said double-acting power device to effect said last named movements of the shifting bars.

3. The combination with a selective transmission mechanism having two axially-spaced shifter bars movable longitudinally to establish different gear relations, of a shifter member movable to select one or the other of the shifter bars, means operatively connected with said shifter member to effect the selecting operation of said member, a double-acting fluid pressure motor having a pressure responsive element operatively connected with said shifter member for moving the same together with the shifter bar selected thereby in opposite directions, a follow-up valve mechanism having operating elements associated with said motor, said valve mechanism controlling the flow of fluid power to said motor, a manually operable control lever movable in one plane for operating the aforementioned shifter member operating means to select a shifter bar to be operated, and movable in a different plane to operate the valve mechanism, and means connecting the control lever to the pressure responsive element through the valve means for manually moving said element and shifting member connected thereto in the event of power failure.

4. In a selective gear shifting transmission having a plurality of shifter rails and also having a shifting mechanism including means operable to select a desired rail and means operable to shift the selected rail to establish different gear relations, a force transmitting means for operating said first means to select a desired shift rail, a fluid pressure operated device for operating said second means to effect the desired gear relation after a selecting operation has been effected, means including a follow-up valve for controlling the flow of fluid to said device, and a manually operated control member mounted remotely from said device and movable in two different planes of movement for respectively controlling the operation of said force transmitting means and said follow-up valve.

5. The combination with a selective transmission mechanism having two axially-spaced shifter bars movable longitudinally to establish different gear relations, of a shifter mechanism including means normally in operative relation with one of said shifter bars but operable to select the other of the shifter bars, force transmitting means operatively connected with said shifter mechanism to effect a selecting operation thereof, resilient means associated with said mechanism for normally maintaining said shifter mechanism in its normal position to select one of the shifter bars, a double-acting fluid pressure motor operatively connected with said shifter mechanism for operating the selected shifter bar longitudinally in opposite directions, a follow-up valve mechanism having operating elements associated with said motor, said valve mechanism controlling the flow of fluid power to said motor, and a remotely-positioned manually operable member, movable in one direction for controlling said force transmitting means, and movable in another direction for operating said valve mechanism.

6. In an automotive transmission operating mechanism, a pair of cooperating actuating and actuated fluid pressure devices, the latter device being adapted to be operably connected to a change-speed transmission, fluid transmitting connections interconnecting said devices, and a pressure differential operated motor operably connected to said actuating device.

7. In an automotive transmission operating mechanism, a pair of cooperating fluid devices comprising an actuating device and an actuated motor operably connected to the transmission, and a vacuum suspended pressure differential operated motor operably connected to said actuating device.

8. A vehicle having a transmission having a plurality of shift members and provided with an operating member movable back and forth in one direction for selective interengagement with said shift members and movable back and forth in another direction to shift the selected shift member to change speed, in combination with a control member operable by the driver in a plurality of directions, means operated by movement of the control member in one direction to effect said selective interengagement of the operating member with one or the other of the shift members, a fluid operated device for causing said back and forth shifting movement of the selected shift member, and control means for the fluid operated device operated by movement of the control member in another direction to cause said shifting movement.

9. The combination with a selective transmission mechanism having a plurality of spaced shifter bars movable longitudinally to establish different gear relations, of a shift member angularly and bodily movable in the same plane to select one or another of said shifter bars, means operatively connected with said shifter member to effect such selecting movement, a fluid pressure motor operatively connected with said shifter member for moving the same, together with the shifter bar selected thereby, in opposite directions, force transmitting means connected with the first means, means associated with said motor for controlling the fluid pressure therein, and a single remotely positioned manually operable control lever operatively associated with the force transmitting means and with the means associated with the motor and movable in one plane for operating the force transmitting means, and movable in another plane for operating the means associated with the motor.

10. The combination with a selective transmission mechanism having a plurality of spaced shifter bars movable to establish different gear relations, of a shifter member movable to select a desired shifter bar and shiftable in opposite directions with the selected bar to establish the desired relation, and means for actuating said shifter member to effect said selecting and shifting movements comprising a manually operable control member positioned remotely from the transmission and shifter member, means for mounting said control member for movement in opposite directions in different planes, force transmitting means connecting the control member and shifter member to actuate the latter to select one or another of the shifter bars in accordance with movement of the control member in opposite directions in one plane, a double-acting fluid pressure motor having a pressure responsive element movable in opposite directions, force transmitting means connecting said element and shifter member for moving the latter in accordance with movement of the element in said opposite directions, fluid pressure-conducting means associated with said motor for conducting fluid energy to and from the motor and follow-up valve means associated with said fluid pressure-conducting means comprising two parts mounted for relative movement for controlling the fluid pressure energization of said motor and for movement together in the event of failure of fluid pressure, one part being connected with said fluid pressure responsive element and the other part being connected to the control member and actuated by movement thereof in opposite directions in a plane different from said one plane.

11. The combination with a selective transmission mechanism having means operable to establish different gear relations, means connected with the transmission mechanism to operate the latter to select the gear setting to be established, a fluid pressure motor operably connected with said transmission mechanism for operating the same to establish the desired gear setting, fluid transmitting connections associated with said motor, and a manually operable control lever also associated with said connections and positioned remotely from the aforementioned transmission operating means and movable laterally and longitudinally for respectively effecting the aforementioned selective operation of the transmission and for controlling the fluid pressure motor through said connections to establish the transmission in the desired gear.

12. The combination with a selective transmission mechanism having two axially-spaced shifter bars movable longitudinally to establish different gear relations, of a shifter mechanism, including means normally in operative relation with one of said shifter bars but operable to select the other of the shifter bars, force transmitting means operatively connected with said shifter mechanism to effect a selecting operation thereof, resilient means associated with said mechanism for normally maintaining said shifter mechanism in its normal position to select one of the shifter bars, a hydraulically operated device operatively connected with said shifter mechanism for operating the selected shifter bar longitudinally in opposite directions, means including a double-acting fluid pressure motor for operating said hydraulically operated device in opposite directions, a follow-up valve mechanism having operative elements associated with said motor, said valve mechanism controlling the flow of fluid power to said motor, and a remotely-positioned manually operable member, movable in one direction for controlling said force transmitting means, and movable in another direction for operating said valve mechanism.

13. A vehicle having a transmission provided with a plurality of shift members and having an operating member movable back and forth in one direction for selective interengagement with said shift members and movable back and forth in another direction to shift the selected shift member to change speed, in combination with a control member operable by the driver in a plurality of directions, means operated by movement of the control member in one direction to effect said selective interengagement of the operating member with one or the other of the shift members, a hydraulically operated device for causing said back and forth shifting movement of the selected shift member, a fluid operated motor for controlling the operation of said device, and control means for the motor operated by movement of the control member in another direction to cause said shifting movement.

14. The combination with a selective transmission mechanism having means operable to establish different gear relations, means connected with the transmission mechanism to operate the latter to select the gear relation to be established, hydraulic means operatively connected with said first means for operating the latter to establish the desired gear relation, a fluid pressure motor operatively connected with said hydraulic means, fluid transmitting connections associated with said motor, and a manually operable control lever also associated with said connections and positioned remotely from the aforementioned transmission operating means and movable in opposite directions in two different planes of movement for respectively effecting the aforementioned selective operation of the transmission and for controlling the fluid pressure motor through said connections to establish the transmission in the desired gear.

VICTOR W. KLIESRATH.
ROY S. SANFORD.

DISCLAIMER 2,212,442.—*Victor W. Kliesrath*, South Bend, Ind., and *Roy S. Sanford*, New York, N. Y. HYDRAULIC GEAR SHIFT MECHANISM. Patent dated Aug. 20, 1940. Disclaimer filed July 3, 1946, by the assignee, *Bendix Products Corporation*.

Hereby disclaims claims 1 and 2 of said patent.

[*Official Gazette July 30, 1946.*]